United States Patent

[11] 3,581,698

| [72] | Inventor | John U. Bete<br>2 Main Street, Marion, Mass. 02738 |
|---|---|---|
| [21] | Appl. No. | 734,703 |
| [22] | Filed | June 5, 1968 |
| [45] | Patented | June 1, 1971 |

[54] SAIL BATTEN
4 Claims, 8 Drawing Figs.

[52] U.S. Cl. .................................................. 114/102,
114/103, 161/93, 161/116, 161/149, 161/156, 161/185
[51] Int. Cl. ..................................................... B63h 9/06,
B32b 17/04, B32b 27/38
[50] Field of Search............................................ 114/102--103; 161/38—39, 93, 116, 149, 156, 185; 117/43—44; 124/23—25; 43/6, 18 GF

[56] References Cited
UNITED STATES PATENTS

| 2,597,888 | 5/1952 | Miller............................ | 117/44X |
| 2,608,172 | 8/1952 | Bluw ............................ | 114/103 |
| 2,659,958 | 11/1953 | Johnson ........................ | 161/149X |
| 2,971,207 | 2/1961 | Eicholtz ....................... | 161/GF |
| 3,072,929 | 1/1963 | Skoggard...................... | 161/GF |
| 3,168,068 | 2/1965 | Lasko et al. .................. | 114/102 |

OTHER REFERENCES
Skeist; Irving, Epoxy Resins, Reinhold. Pub. Corp., New York, 1958 (p. 77) (copy in Group 160)

*Primary Examiner*—Harold Ansher
*Attorney*—Chapin, Neal and Dempsey

ABSTRACT: A tough, thin, flexible batten made of layers of strips of material embedded in and bonded together by plastic. The outer layers of the strip may be successively shorter to taper the batten and make it more flexible at one end than the other.

PATENTED JUN 1 1971
3,581,698
SHEET 1 OF 2
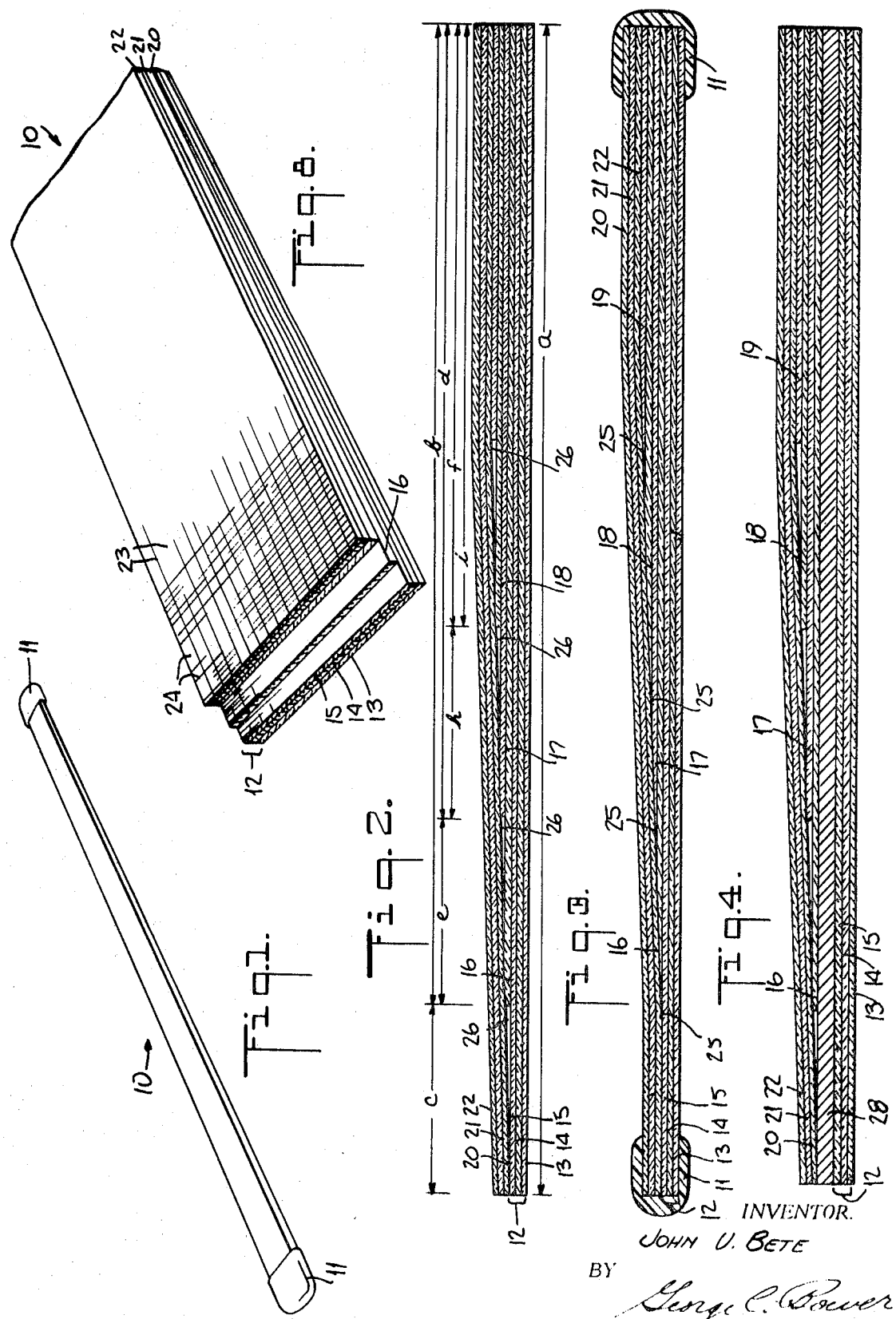
INVENTOR.
JOHN U. BETE
BY
George C. Bower
ATTORNEY

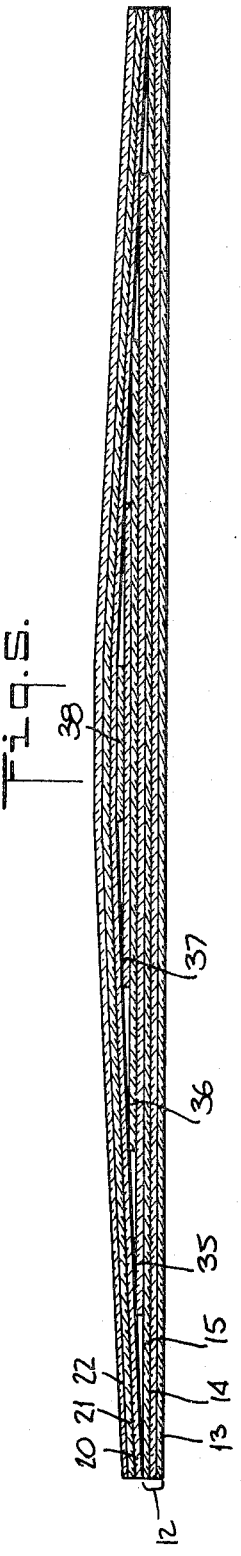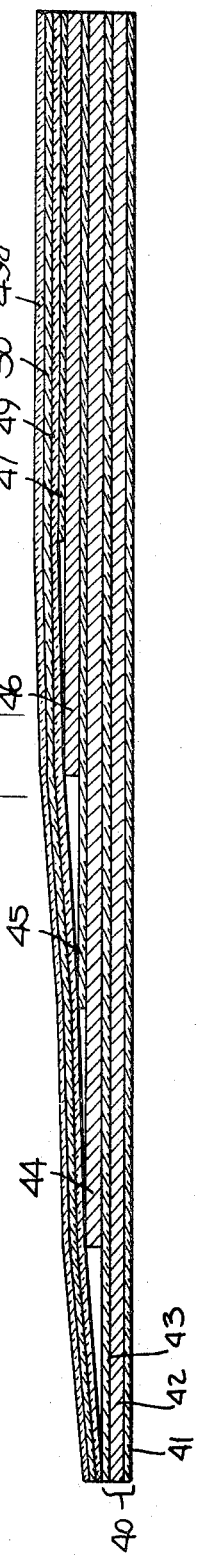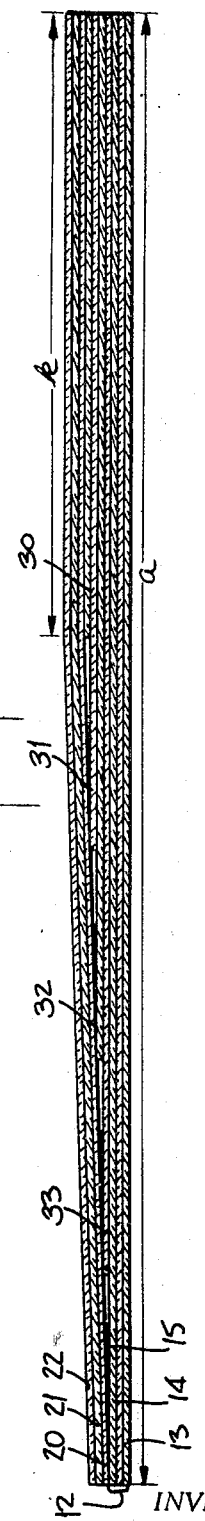

SAIL BATTEN

BACKGROUND OF THE INVENTION

Sail battens fit in long pockets extending from the trailing edge of the sail towards the leading edge of the sail attached to the mast. This stiffens the unattached trailing edge of the sail. The smooth curve or air foil shape of the sail is best maintained by a tapered batten with the thinner flexible end extending into the sail. The thin tapered end has greater flexibility to conform to the curve or air foil of the sail.

In the past these battens have been made of wood or tapered wood with a fiberglass covering. Both types of battens are unsatisfactory. If the end is made sufficiently thin for adequate flexibility, it is weak and will break easily under normal sailing conditions.

SUMMARY OF THE INVENTION

A sail batten comprises layers of material embedded in and bonded by plastic to form a thin, tough, flexible strip. Preferably the number of layers successively increase lengthwise to taper the thickness of the batten for gradually changing the flexibility of the batten along its length while maintaining lateral stiffness.

An object of the invention is to provide laminated layers of material embedded in and bonded together by plastic material to form a tough, thin, longitudinally flexible sail batten.

Another object of the invention is to provide a tapered sail batten of laminated material bonded by and embedded in plastic that is tough and is of greater flexibility at one end than the other.

Another object of the invention is to provide a tapered sail batten made of fiberglass layers embedded in and bonded by plastic.

Other and further objects and advantages of the invention will be apparent from the following description taken in connection with the drawings.

BRIEF DESCRIPTION OF THE DRAWINGS

FIG. 1 is a perspective view of a sail batten.

FIG. 2 is a side view of an uncured layup of layers of similar woven material for forming a tapered batten.

FIG. 3 is a longitudinal sectional view of a cured tapered batten with tips.

FIG. 4 is a side view of an uncured tapered batten layup with a center core of canvas duck.

FIG. 5 is a side view of an uncured layup laterally separated after curing into short tapered battens.

FIG. 6 is a side view of an uncured tapered batten layup having alternate layers of fiberglass and balsa wood.

FIG. 7 is a side view of a tapered batten layup forming on curing a less flexible batten.

FIG. 8 is an enlarged fragmentary perspective view sectionally taken along lines 8—8 of FIG. 2.

DETAILED DESCRIPTION

In FIGS. 1 and 3 a sail batten 10 is shown comprising layers of material bonded into a single piece by setting a resin impregnated in the layers on application of heat and pressure. Thermoplastic tips 11 are provided on the ends of the batten.

The batten 10 has a main part 12 of three main layers 13, 14, 15 extending the length $a$ of the batten. The first short layer 16 extends longitudinally adjacent to the layer 15 and has a length $b$ which is shorter than the main part 12 by a distance $c$. The second short layer 17 extends longitudinally adjacent to the first short layer 16 over a length $d$ which is shorter than layer 16 by a distance $e$. Corresponding successive short layers 18, 19 have lengths $f$ and $g$, respectively, and are shorter by distances $h$ and $i$. Three overlying layers 20, 21, 22 extend the full length $a$ of the batten over the short layers. Thus at the thick end of the batten there are 10 layers and at the thin end there are six layers.

In the layup of FIG. 5 the main layers 13, 14, 15 and the overlying layers 20, 21, 22 extend the full length $a$. Short or stepped layers 35, 36, 37, 38 are arranged to provide a taper in both directions from the midpoint. The thick portion of 10 layers is at the midpoint and both of the ends have a thickness of six layers. After curing the layup is cut at the midpoint to form two tapered battens half the length of the batten of FIG. 3.

The layers are perfectly made of cloth with more longitudinally extending fibers 23 than transversely extending fibers 24 (FIG. 8). This provides the batten with a greater longitudinal strength than lateral strength. The cloth is preimpregnated with a standard dry, uncured epoxy-type resin. The uncured resin coats the fibers of the cloth and fills the spaces between the fibers. The layers are assembled, as previously described, and subjected to heat and pressure. The resin melts and is fully cured. This bonds the layers together and forms the batten as a single solid piece. As illustrated in FIG. 3, the cured resin 25 fills in spaces 26 between the layers.

The change in thickness of the batten along its length varies the flexibility. The thick end has the desired stiffness for the outer end. The gradual increasing flexibility towards the thin end provides a proper air foil shape to the batten.

The relation of the layers may be altered to provide battens with different distributions of flexibility. The batten shown in FIG. 3 has a generally uniformly increasing flexibility. In FIG. 7 a batten is illustrated which is stiffest over the half length $k$ and more flexible over the tapered half $l$. The batten is tapered by stepping the layers as shown in FIG. 7. The main layers 13, 14, 15 and the overlying layers 20, 21, 22 extend the full length of the layup. The shortest layer 30 extends distance $k$ which is, in this embodiment, half of the distance $a$. The stepped layers 31, 32, 33 are each longer by one-eighth of the distance $a$ to gradually taper the other half. Thus the thickness of 10 layers extends half of the full length. Thus the degree of flexibility and of change of flexibility can be easily selected.

In the battens of FIGS. 2, 3 and 5 the cloth layers are woven fiberglass. In FIG. 3 at the thin six layer end the batten is approximately one-sixteenth of an inch thick and at the thick 10 layer end the batten is approximately one-tenth of an inch thick. The battens and layups of FIGS. 2, 3 and 5 are 30 inches long and 1½ inches wide.

Various other materials may be used in making the battens, such as paper, cardboard, balsa wood, bass wood and cotton duck or canvas. The layers of these materials may be interleaved with the fiberglass layers. Wood, paper and balsa wood should be very dry. Balsa wood is in very dry condition and has a thickness of approximately one thirty-second of an inch.

In the batten shown in FIG. 4 the layup has a layer 28 of cotton duck or canvas between the main part 12 and the other fiberglass layers of the layup of FIG. 2. The shorter layers 16 to 19 and the overlying layers 20, 21, 22 are of fiberglass. The fiberglass and canvas layers are impregnated with the epoxy resin. The batten is formed by curing the resin under heat and pressure in a manner similar to the embodiment of FIG. 3.

In the layup shown in FIG. 6 the layers are alternately fiberglass and balsa wood. The main part 40 comprises a balsa wood layer 42 between fiberglass layers 41, 43. The first and third short layers 44 and 46 are balsa wood and the second and fourth layers 45 and 47 are fiberglass. The overlying layers 48 have a balsa wood layer 50 between two fiberglass layers 49, 49a. The balsa wood and fiberglass batten is less expensive and stronger than the all fiberglass batten of FIG. 3. The wood strips are uniform in thickness and are lapped the same as the fiberglass to form a tapered batten. Wood may be used where extreme stiffness is require.

The impregnated cloth forms a satisfactory surface on the application of heat and pressure. Polyethylene sheets may be placed on the outer surfaces of the layups to impart smoother and glossier finishes to the battens on curing. The finishes may be colored by colored polyethylene sheets. Other fabrics, for example dacron, may be used for special finishes.

Due to the thinness of the battens it is desirable to round the ends. Plastic tips 11 are provided by dipping the ends of the battens in a hot liquid thermoplastic. The plastic cools to form a protective coating. Prefabricated tips of vinyl plastisol, rubber or other material may also be used.

It is thus seen from the foregoing description that a thin, tough and flexible batten has been developed. The fiberglass layers are quite thin and if balsa wood layers are used the balsa wood, as previously described, has a thickness of approximately one thirty-second of an inch. Thus composite battens may be made which provides a versatility as to cost, size and characteristics.

The battens are not limited to the specific number of layers set forth or the materials used in the layers. Thus various additional types of battens may be made from the teachings of the foregoing description.

The invention is set forth in the appended claims.

I claim:

1. A sail batten characterized by a varying flexibility at different locations throughout its length comprising an integral substantially void free fiberglass-resin composite structure of incrementally decreasing thickness from one end to the other end of said batten, said composite including at least two outer strips of fiberglass fabric of a length equal to the length of said batten and a plurality of shorter strips of different lengths, each of equal thickness throughout its length, said shorter strips being interposed between the outer strips and extending from the thicker end of said batten and terminating at a series of longitudinally spaced points along the length of the batten, the degree and location of maximum flexure of said batten being determined by the location of said spaced points and the number of said shorter strips which terminate at each of said points.

2. A sail as set forth in claim 1, in which said fiberglass fabric is woven and wherein said resin is a cured thermosetting resin.

3. A sail batten as set forth in claim 1, wherein thermoplastic tips are fitted over the ends of the batten.

4. A sail batten as set forth in claim 1, wherein said fabric is a woven material having a greater number of strands extending longitudinally of the batten than transversely thereof to impart greater longitudinal strength thereto.